United States Patent [19]

Wilhelm

[11] Patent Number: 5,233,594
[45] Date of Patent: Aug. 3, 1993

[54] EASILY INSTALLABLE REMOVABLE INTEGRATED HARD DISK AND CONTROLLER

[76] Inventor: Joseph R. Wilhelm, 2618 Palisades Crest Dr., Lake Oswego, Oreg. 97034

[21] Appl. No.: 694,477

[22] Filed: May 2, 1991

[51] Int. Cl.⁵ .......................................... G11B 33/02
[52] U.S. Cl. ................................ 369/75.1; 360/98.01
[58] Field of Search .................. 369/77.1, 75.1, 77.2; 364/708; 360/98.01

[56] References Cited

U.S. PATENT DOCUMENTS

| | | | |
|---|---|---|---|
| 4,754,397 | 6/1988 | Varaiya et al. | 364/200 |
| 4,912,580 | 3/1990 | Hanson | 369/75.1 |
| 4,937,806 | 6/1990 | Babson et al. | 369/75.1 |
| 4,941,841 | 7/1990 | Darden et al. | 439/377 |
| 4,977,532 | 12/1990 | Borkowicz et al. | 364/708 |

OTHER PUBLICATIONS

Cook et al., "Customer Set-up and Replaceable DASD Assemblies", IBM Technical Disclosure Bulletin, vol. 27, No. 7b, Dec. 1984.

Primary Examiner—Paul M. Dzierzynski
Assistant Examiner—James Beyer
Attorney, Agent, or Firm—Price, Gess & Ubell

[57] ABSTRACT

The present invention relates to an easily installable, repeatedly removable self-contained mass storage device for use in a computer having a computer housing and an externally-accessible accessory aperture on the computer housing in which accessory aperture are located a plurality of multisignal bus receptacles and a corresponding plurality of card slots on either side of each receptacle. The self-contained mass storage device is comprised of a substantially enclosed housing in which a controller card and a hard drive are installed. The housing carries one pair of slide edges for slidably engaging one of the card slots and the edges of the controller card are exposed outside of the housing for slidably engaging another one of the card slots. Electrical connectors on the controller card are also exposed outside of the housing for making electrical connection with the receptacle in which the controller card is located.

7 Claims, 3 Drawing Sheets

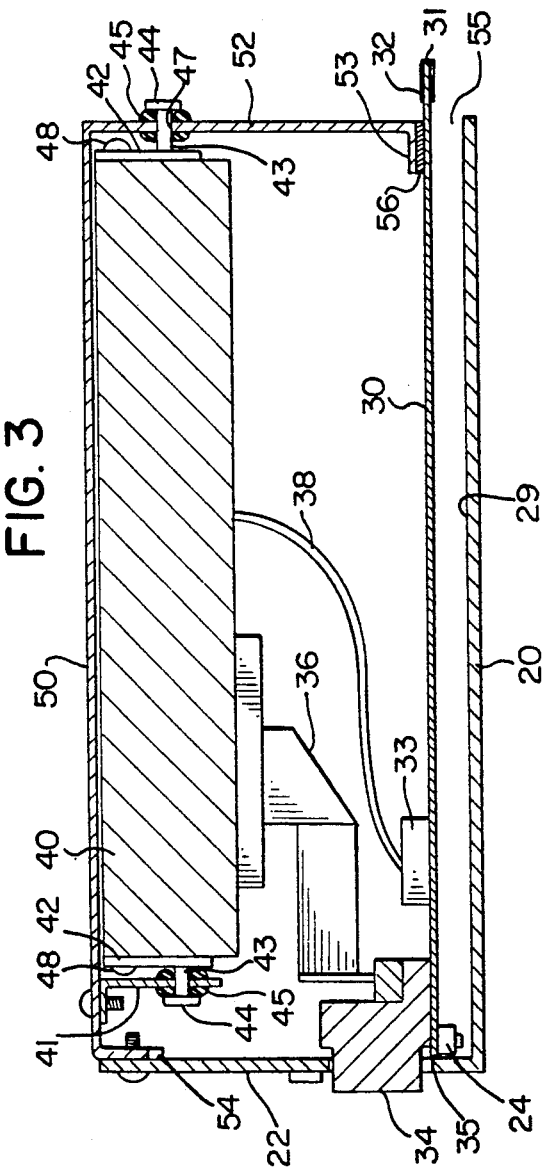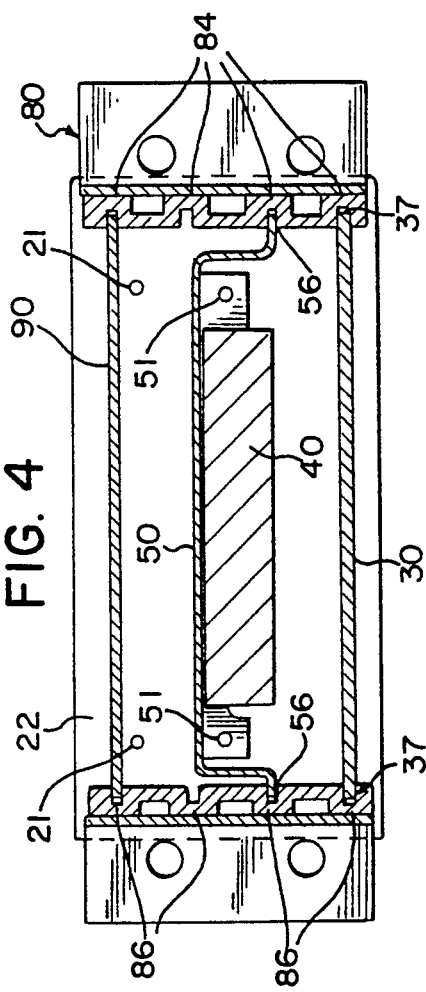

EASILY INSTALLABLE REMOVABLE INTEGRATED HARD DISK AND CONTROLLER

BACKGROUND OF THE INVENTION

1. Field of the Invention

The present invention relates generally to computer add-on devices and, more particularly, to an easily installable, removable, self-contained mass storage device for use with a computer having a bus system accessible through an aperture in the computer housing.

2. Description of Related Art

Most modern computers include an internal bus having a plurality of multisignal receptacles for insertion of various add-on circuit cards having conductive edge or connector terminals. Add-on or plug-in circuit cards provide the computer with such features as additional memory, IEEE 488 interface, a modem interface, and extra serial or parallel I/O ports.

Many computers include a housing defined above a substantially flat base having an upwardly-extending back wall and front wall and below a removable cover comprised of a top wall having two downwardly-extending side walls. An example of such a computer is any one of the so-called PC compatibles found in nearly any office. The base of such a computer supports the multisignal receptacles, add-on cards, and other components, such as a power supply, floppy disks, hard disks, etc., within the interior of the housing.

In the past several years, mass storage devices, such as hard disks, have become commonplace as both original and add-on equipment for computers of all types. A hard disk, used to store and retrieve large quantities of digital information, is generally comprised of a plurality of record-like platters having a magnetic coating and a plurality of read/write heads for reading and writing digital information on the platters. External contaminants such as smoke and dust can destroy a hard disk because the read/write heads float extremely near to the platter surfaces being rotated at high speed. Because of this concern, hard disks are provided in hermetically sealed canisters that include the necessary electronics and interface connections to allow external control of hard disk operations.

A controller card is also needed to operate a hard disk. The controller card provides an electronic interface between the computer bus system and the hard disk in one of five common disk interface types: IDE; ESDI (Enhanced Small Device Interface); SCSI (Small Computer System Interface); ST-506; and ST-412. In general, the controller card is an add-on circuit card that plugs into the bus system and is therefore physically separate from the hard disk. Power and I/O cabling are provided between the controller card and the remote hard disk, which may be located inside or outside of the computer housing.

In a conventional computer having an internal bus system, the installation of a hard disk and controller card is relatively permanent and is a labor intensive and time consuming process. Installation typically requires removal and replacement of the cover and the numerous fasteners that attach the cover to the base. With the cover off, the controller card is installed by pressing its edge connector into an empty multisignal receptacle (a "slot"), the hard disk is mounted onto or adjacent the base with screws or straps, or both, and the necessary power and I/O cabling is connected between the controller card and the hard disk. The cover and fasteners are then replaced.

Many companies must take security precautions with information considered to be proprietary or vital to national security. Such information can, of course, be stored in various types of computer storage media, including hard disks, floppy disks, and tape drives. With floppy disks and tape drives, the storage medium may be easily removed and secured when not in use. However, the same removal process is not possible with the just-described conventional hard disks, since they are permanently mounted in the interior of the computer housing. Because of the generally fixed nature of hard disks, sensitive information is frequently stored on removable floppy disks, while other non-sensitive information is stored on the hard disk. This is very inefficient. Also, floppy disks have limited storage capacity and their access speed and transfer rate are very slow relative to hard disks.

One approach to simplifying the task of hard disk installation is set forth in U.S. Pat. No. 4,639,863, issued to Harrison et al. on Jan. 27, 1987. Harrison et al. offer an add-on circuit card that contains both a controller and a hard disk. Although the apparatus of the '863 Patent simplifies and speeds up the installation of a hard disk in a computer having an internal bus system, it is not designed for, nor is it suitable for day-to-day removal and replacement. In particular, the apparatus of the '863 Patent is undesirable for removal and replacement because the user must remove and replace the computer cover to gain access to the card, and because the controller circuitry is exposed and subject to static damage if handled.

Other removable media devices are available, such as those that utilize the 5¼-inch peripheral bay. The SyQuest Model SQ555 is an example of such a device. The limitation of all such devices that utilize a 5¼-inch mounting bay is that they require significant disassembly of the typical computer system for installation. Another limitation of these particular devices is storage capacity. Typical removable cartridge capacity is about 44 Mbytes as compared to half a Gbyte or more for hard disks.

Some computer manufacturers, such as HEWLETT-PACKARD, offer a computer having an enclosure wherein the multisignal receptacles of a bus system are accessible through an aperture provided in an exterior wall of the enclosure. The present inventor calls this type of bus system an externally accessible bus system because add-on circuit cards may be inserted and removed from the interior of the computer without having to remove a cover or disassemble the computer to any extent.

In a computer having such an externally accessible bus system, the standard hard disk is conventionally mounted permanently inside of the computer housing. This arrangement is undesirable because an internal, permanently mounted hard disk is difficult and time consuming to install and obviously not readily removable. Upgrading, replacing, or removing (e.g., for security) such a device is an impractical and laborious task.

Free standing external hard disks may also be connected to such a computer system. With an external hard disk, an interface card (e.g., a SCSI card) is installed in the externally accessible bus system and a cable is connected between the external hard disk and I/O signals on the interface card. The free standing external hard disks are undesirable as well, because such devices typically require a substantial amount of desk space or rack space if the computer is in a rack and are usually too bulky and cumbersome to be readily placed in a safe for secure keeping.

SUMMARY OF THE INVENTION

In recognition of the need for an easily installable, repeatedly removable mass storage device for use in a computer having a computer housing and an externally-accessible accessory aperture on the computer housing in which accessory aperture are located a plurality of multisignal bus receptacles and a corresponding plurality of card slots on either side of each receptacle, the present invention is comprised of a rotating fixed disk provided in a sealed disk housing; a circuit board supporting electronic circuitry for controlling the operation of the rotating fixed disk, the circuit board comprising an electrical connection means for electrically connecting the circuit board to one of the bus receptacles and a first pair of opposed elongate extensions for sliding engagement with a first one of said card slots; electrical connection means for connecting the circuit board with the rotating fixed disk; a substantially enclosed housing having a second pair of opposed elongate extensions for sliding engagement with a second one of said card slots; means for mounting said rotating fixed disk within said substantially enclosed housing; means for mounting said circuit board within said substantially enclosed housing; first means for exposing said first pair of opposed elongate extension of said circuit board to said first one of said card slots outside of said substantially enclosed housing; and second means for exposing said electrical connection means to said one of the bus receptacles outside of said substantially enclosed housing; whereby rapid and repeated installation and removal of said self-contained mass storage device, both mechanical and electrical, is possible.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 is a cross-sectional view of the easily installable, repeatedly removable mass storage device of FIG. 1 taken along section lines 3—3; and FIG. 4 is a cross-sectional view of the easily installable, repeatedly removable mass storage device of FIG. 1 taken along section lines 4—4, and showing an add-on card 90 installed above the device.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an easily installable, repeatedly removable integrated hard disk and controller.

Figure 1:
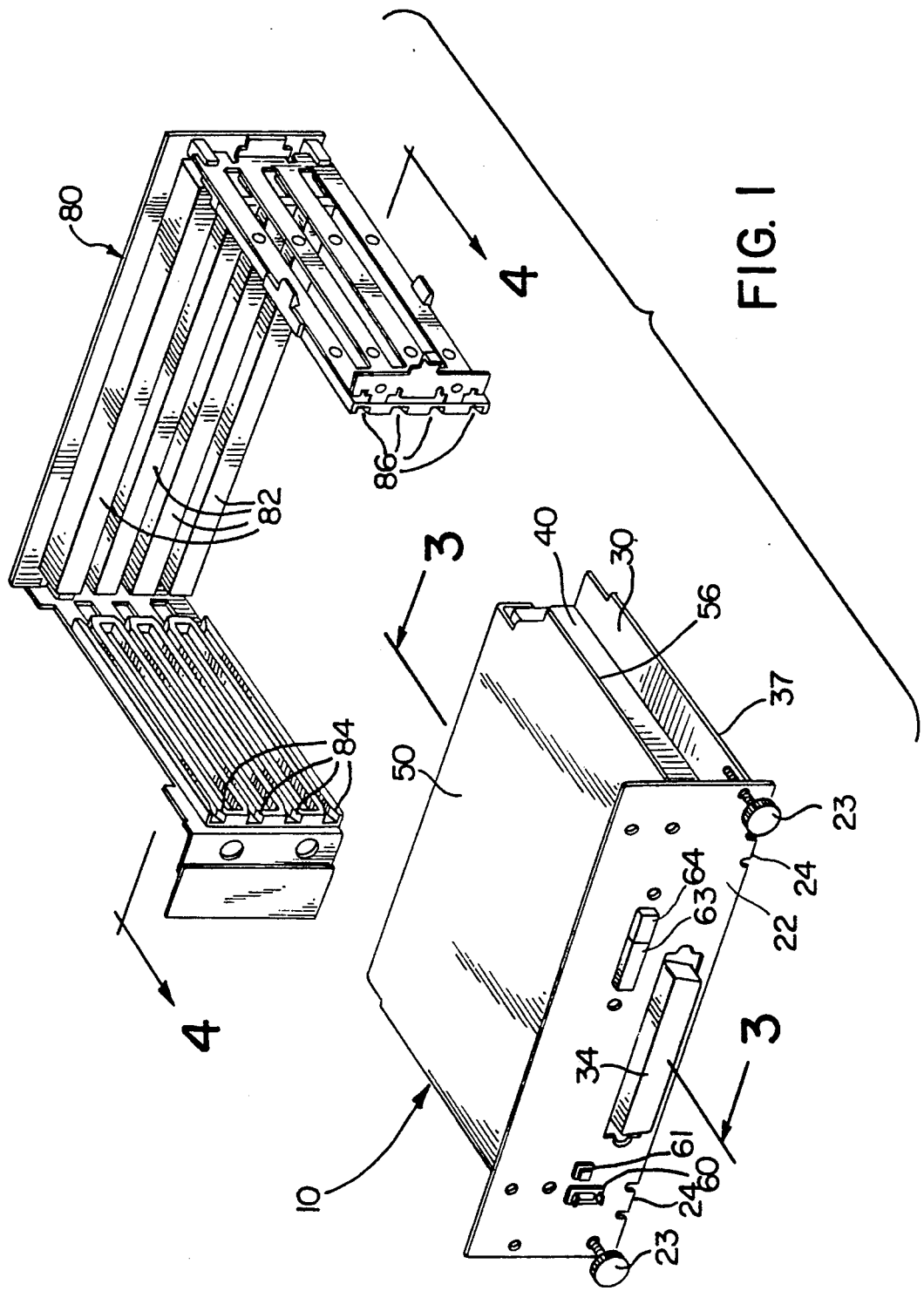
FIG. 1 is a perspective view of an easily installable, repeatedly removable mass storage device according to the present invention and a typical receptacle chassis into which it may be removably plugged.
Figure 2:
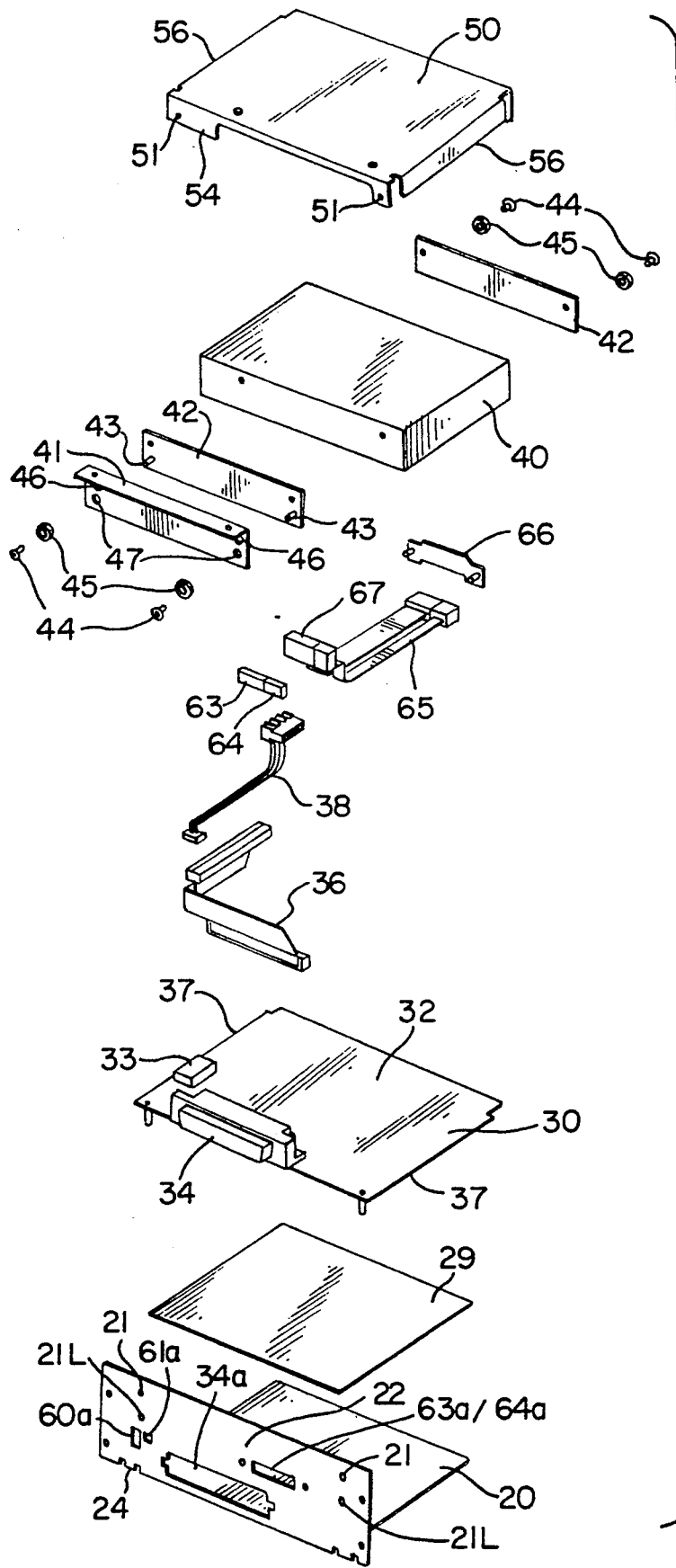
FIG. 2 is an exploded perspective view of the easily installable, repeatedly removable mass storage device of FIG. 1.

An integrated hard disk module 10 and an exemplary externally accessible bus system chassis 80 are shown in FIG. 1. The bus system chassis 80 is like that found in the HEWLETT-PACKARD 9000 Series 300 family of computers. As shown, the bus system chassis 80 is comprised of a plurality of back plane connectors or multisignal receptacles 82 and a corresponding plurality of paired horizontally-opposed slots 84, 86. In the HEWLETT-PACKARD computers, the bus system chassis 80 is installed such that the slots 84, 86 are accessible through an aperture in an exterior wall of the computer housing (not shown). In this arrangement, various add-on circuit cards can be inserted and removed from the back plane connectors 82 without need to disassemble the computer.

The integrated hard disk module 10 of FIG. 1 is a self-contained mass storage device that may be easily inserted and removed from the bus system chassis 80. As shown in FIGS. 1 to 4, the hard disk module 10 is comprised of a controller card 30 and a hard disk 40 mounted in a protective housing comprised of a base plate 20, a front plate 22, a lid 50, and a back plate 52. The just-mentioned components of the protective housing are preferably formed from sheet metal, but any other suitable material may be used.

In the preferred embodiment, the base plate 20 and the front plate 22 are integrally formed from a single sheet. The front plate 22 extends perpendicularly from the base plate 20 and contains a plurality of apertures 34a, 60a, 61a, and 63a/64a for carrying various connectors, configuration switches, or indicators.

As shown in FIG. 1, the front plate 22 carries an address selection switch 60 for allowing external selection of a SCSI address for the hard disk; a hard disk activity indicator 61 such as an LED; a first parameter switch 63 for setting parameters for the SCSI host adaptor such as the select code and interrupt level; a second parameter switch 64 for setting a SCSI address and a parity selection parameter; and a SCSI I/0 connector 34.

As best shown in FIG. 3, the front plate 22 is further comprised of a pair of support tabs 24 that are bent back from the front plate 22 so as to extend parallel to and horizontally above the base plate 20. The controller card 30 is rigidly fastened to the support tabs 24 with any desirable fastening means such as sheet metal screws. To prevent shorting, an insulating sheet 29 is located below the controller card 30 on the top side of the base plate 20.

The controller card 30 is preferably an intelligent (SCSI) interface/controller card comprised of a central portion and a pair of slide wings 37 on a left and right side thereof for sliding engagement with one of the paired slots 84, 86 of the bus system chassis 80. An electrical connection means such as an edge connector 32 with a plurality of conductive areas is formed on a back edge 31 of the controller card 30. The edge connector 32 fits into and electrically interconnects with any one of the multisignal receptacles 82 of the bus system chassis 80. Other electrical connection means such as plug jacks housing conductive connectors are, of course, possible.

The preferred controller card 30 includes a power connector 33 for providing operating power to the hard disk 40 via a power cable 38. A data cable 36 provides data interconnection between the card and the hard disk 40. As the preferred controller card 30 is an intelligent (SCSI) interface/controller card, a SCSI I/0 connector 34 is provided on a front edge 35 of the controller card 30 and protrudes through a corresponding one of the apertures 34a carried by the front plate 22.

The first and second parameter switches 63, 64 are electrically connected to the controller card with a ribbon cable 65. A plate 66 is provided to retain an end 7 of the ribbon cable and the parameter switches 63, 64 in the aperture 63a/64a of the front plate 22.

The lid 50 is comprised of a back plate 52, a front mounting plate 54, and a pair of slide wings 56. The front mounting plate 54 includes a pair of apertures 51 for fastening the lid 50 one of to a corresponding pair of upper apertures 21 or lower apertures 21L in the front plate 22. The upper and lower apertures 21, 21L are provided to accommodate hard disks 40 of different thicknesses. In the preferred embodiment, the upper apertures 21 are for standard height drives (e.g. a 1.625" thick drive) and the lower apertures 21L are for low profile drives (e.g. a 1" thick drive). As shown in FIG. 4, an add-on card 90 may be accommodated in the upper pair of slots 84, 86, above the lid 50 and behind the front plate 22, when a low profile hard drive 40 is used. If a standard hard drive were used, the lid 50 would be attached to the upper apertures 21 and there would be no space for the add-on card 90.

The hard disk 40 is suspended from an underside of the lid 50 with a shock mount suspension comprised of a pair of disk adapter plates 42, an apertured front shock support 41, a plurality of rubber grommets 45, and a plurality of shoulder nuts 44. In the preferred embodiment, the front shock support 41 is suspended from the lid 50 with sheet metal screws, as shown in FIG. 3. The disk adapter plates 42 are fastened to the left and right sides of the hard disk 40 with fasteners, and each includes a pair of outwardly-extending threaded posts 43.

The front shock support 41 includes a pair of upper apertures 46 and lower apertures 47. The back plate 52 serves as a rear shock support, and thus includes apertures corresponding to the upper and lower apertures 46, 47 of the front shock support 41. The threaded posts 43 of the disk adapter plates 42 are arranged to protrude through the lower apertures 47 of the front shock support 41 and the back plate 52. Two upper apertures 46 are provided to accommodate and allow movement of the fasteners 48. A rubber grommet 45 is inserted into each of the lower apertures 47, and then a shoulder nut 44 is pushed through the rubber grommet 45 and turned onto the threaded post 43 of the disk adapter plate 42. In this fashion, the hard disk 40 is elastically suspended from the lid 50 to prevent the hard disk module 10 from being damaged from shock and vibration such as that encountered during operation, removal, replacement, transport, or storage.

The dimension of the back plate 52 is such that a space 55 is defined between a bottom edge 53 and the base plate 20. The space 55 allows the controller card 30 to extend beyond the vertical plane of the back plate 52 such that the back edge 31 and edge connectors 32 may be inserted into one of the multisignal receptacles 82. It has also been found desirable to locate a foam pad 56 between the controller card 30 and the bottom edge 53 of the back plate 52. The foam pad 56 helps to prevent the controller card 30 from being damaged. The foam pad 56 is preferably comprised of a foam strip with an adhesive backing.

Installation of the integrated hard disk module 10 is very simple. The module is simply oriented such that the edge connectors 32 face the back plan connectors 82, and then slid into the bus system chassis 80 by engaging the slide wings 56 of the lid 50 and the slide wings 37 of the controller card 30 with two appropriately spaced pairs of opposed slots 84, 86. The module is then secured with thumb screws 23. Removal for secure storage is equally simple.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A repeatedly installable, repeatedly removable self-contained mass storage device for use in a computer having a computer housing and an externally-accessible accessory aperture on the computer housing in which accessory aperture are located a plurality of multisignal bus receptacles and a corresponding plurality of card slots on either side of each receptacle comprising:

a rotating fixed disk provided in a sealed disk housing;
a circuit board including a central portion supporting electronic circuitry for controlling the operation of the rotating fixed disk, the circuit board comprising an electrical connection means for electrically connecting the circuit board to one of the bus receptacles and a first pair of opposed elongate extensions on a left and a right side of the central portion for sliding engagement with a first one of said card slots;
electrical connection means for connecting the circuit board with the rotating fixed disk;
a substantially enclosed housing having a second pair of opposed elongate extensions for sliding engagement with a second one of said card slots;
means for mounting said rotating fixed disk within said substantially enclosed housing;
means for mounting said circuit board within said substantially enclosed housing;
first means for exposing said first pair of opposed elongate extensions of said circuit board to said first one of said card slots outside of said substantially enclosed housing; and
second means for exposing said electrical connection means to said one of the bus receptacles outside of said substantially enclosed housing;
whereby said self-contained mass storage device may be repeatedly installed and removed from the externally-accessible accessory aperture.

2. The repeatedly installable, repeatedly removable self-contained mass storage device of claim 1 wherein said means for mounting said rotating fixed disk within said substantially enclosed housing is comprised of a means for suspending the rotating fixed disk to protect it from shock and vibration.

3. The repeatedly installable, repeatedly removable self-contained mass storage device of claim 1 wherein said substantially enclosed housing is comprised of a base plate, a front plate extending vertically upward from the base plate, a lid extending backward from the front plate and substantially parallel to the base plate, and a back plate extending vertically downward and towards though not to said base plate so as to define a space therebetween, and wherein said second means for exposing is comprised of said space.

4. The repeatedly installable, repeatedly removable self-contained mass storage device of claim 3 wherein said means for mounting said rotating fixed disk within said substantially enclosed housing is comprised of a means for suspending the rotating fixed disk to protect it from shock and vibration.

5. The repeatedly installable, repeatedly removable self-contained mass storage device of claim 3 wherein said means for mounting is a suspension system comprising:
first and second support plates, each plate defining a plurality of apertures having rubber grommets contained therein; and
first and second disk adapter plates respectively fastened to opposite sides of the disk housing of said rotating fixed disk, each disk adapter plate having protrusions extending outwardly therefrom and through corresponding ones of rubber grommets contained in the apertures of said support plates.

6. The repeatedly installable, repeatedly removable self-contained mass storage device of claim 5 wherein said first support plate is comprised of said back plate of said substantially enclosed housing and wherein said second support plate is comprised of a separate plate that is fastened to and extends downward from the lid of said substantially enclosed housing.

7. A repeatedly installable, repeatedly removable self-contained mass storage device for use in a computer having a housing and an accessory aperture on the housing in which accessory aperture are located a plurality of multisignal bus receptacles and a corresponding plurality of card slots on either side of each receptacle comprising:

a rotating fixed disk provided in a sealed disk housing;
a circuit board including a central portion for supporting electronic circuitry for controlling the operation of the rotating fixed disk, the circuit board comprising a metallic edge connector formed on a back edge of the circuit board, said circuit board including a first pair of opposed elongate extensions on a left and a right side of the central portion for sliding engagement with a first one of said accessory card slots;
a substantially enclosed housing comprised of a base plate, a front plate extending vertically upward from the base plate and having a plurality of apertures therein, a lid extending backward from the front plate and substantially parallel to the base plate, and a back plate extending vertically downward from the lid, the back plate being dimensioned to define a space between it and the base plate, said housing being dimensioned to fit within said accessory aperture and said lid having a second pair of opposed elongate extensions for sliding engagement with a second one of the accessory card slots;
means for suspending the rotating fixed disk in said substantially enclosed housing to protect it from shock and vibration; and
means for supporting the circuit board within the housing such that the second pair of opposed elongate extensions are disposed parallel to the first pair and such that the metallic edge connector is disposed through the space between the back plate and the base plate whereby the metallic edge connector may removably and electrically interface with the multisignal receptacles located in the externally accessible accessory aperture and corresponding to said first one of said accessory card slots.

* * * * *